S. MAYER.
Apparatus for Cutting Goods on Bias.
No. 160,607. Fig. 1. Patented March 9, 1875.
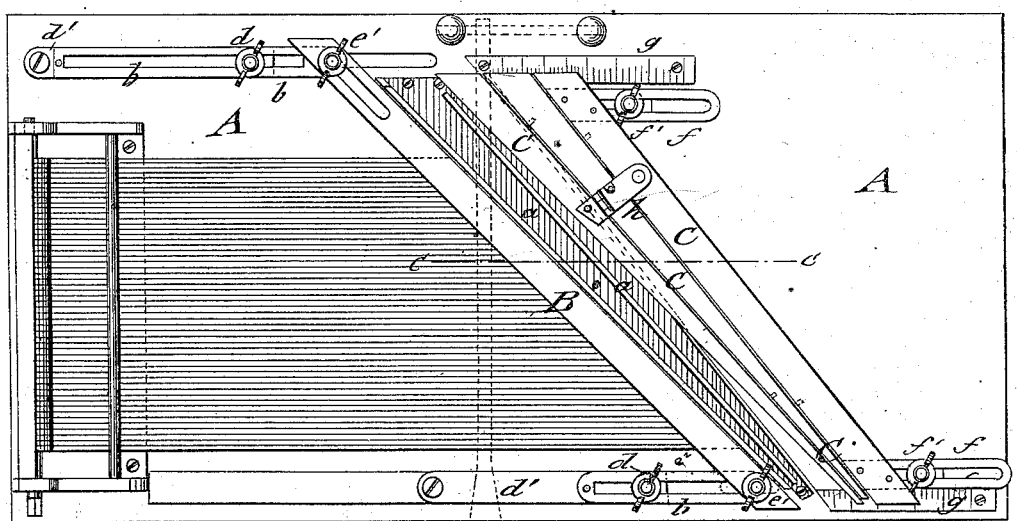
Fig. 2.
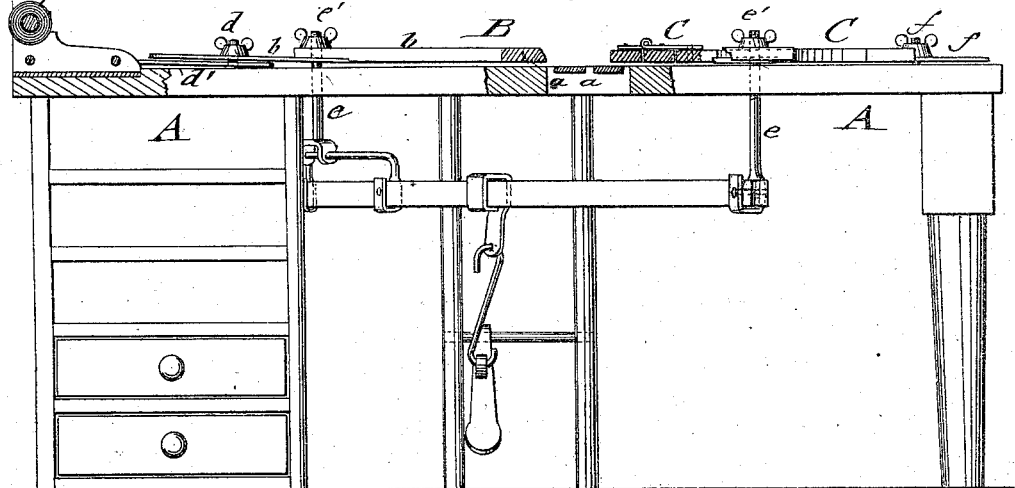
WITNESSES:
Chas. Nida
A. F. Terry
INVENTOR:
S. Mayer
BY
ATTORNEYS.

UNITED STATES PATENT OFFICE.

SALOMON MAYER, OF NEW YORK, N. Y.

IMPROVEMENT IN APPARATUS FOR CUTTING GOODS ON BIAS.

Specification forming part of Letters Patent No. 160,607, dated March 9, 1875; application filed January 30, 1875.

*To all whom it may concern:*

Be it known that I, SALOMON MAYER, of the city, county, and State of New York, have invented a new and Improved Apparatus for Cutting Goods on Bias, of which the following is a specification:

In the accompanying drawing, Figure 1 represents a top view of my improved apparatus for cutting goods on bias; and Fig. 2, a vertical longitudinal section of the same on the line $c\ c$, Fig. 1.

Similar letters of reference indicate corresponding parts.

The object of my invention is to furnish to manufacturers of various articles requiring goods to be cut on bias an improved apparatus by which the cutting up of goods to strips of different width and angle may be accomplished in a rapid and convenient manner.

The invention consists of a table with one or more knife-grinding bias slots, in connection with an adjustable treadle-acted clamp-piece and adjustable gage-pieces, which are set to the required width and angle of the bias strips, for cutting a suitable number of layers at the same time.

In the drawing, A represents a table of suitable size, on which the fabrics to be cut on bias are spread to be fed to the clamping and gaging devices. The table is in suitable manner provided at one end thereof with a rack and detachable rollers, for winding up the goods thereon by means of a hand-crank attached to the projecting end, three or more layers being wound upon each roller, so that the fabrics may be exposed in considerable thickness to the cutting-knife. The table A is constructed with as many slots $a$, extending across the table at the angles most frequently used in cutting goods on bias, said slots being lined with suitable metal to retain the degree of accuracy required in cutting, and being of greater durability. The goods are firmly secured to the table, for being cut along the slot or bias required, by means of a clamp-piece, B, which is adjustable to each slot by slotted guide-strips $b$, which are clamped, by set-screws $d$, to stationary spring-strips $d'$, placed longitudinally at the sides of table A, and, by end bolts $e$ and clamping-nuts $e^1$, to the slotted guide-strips $b$, the bolts $e$ passing through slots $e^2$ of the table, to be connected with the treadle mechanism below in suitable manner. As soon as the clamp-piece B is adjusted, and the goods are placed in position for cutting, the treadle is depressed, and thereby the goods rigidly secured to the table until, on the release of the treadle, the supporting spring-strips raise the clamp-piece for feeding the fabrics forward for the next cutting. The width of the strips cut on the bias angles is defined by adjustable gage-pieces C, which are secured, by slotted guide-strips $f$ and set-screws $f'$, to graduated strips $g$ of the table. The exact parallel position of the gage-pieces to the slots and the even width of the bias strips are thereby secured. The gage-pieces C are detachable from the main piece, which is parallel to the slot having the greatest angle, and cutting, therefore, the shortest strips from the goods, each piece corresponds to a certain slot, and is applied by set-pins and a pivoted or spring locking device, $h$, to the base-piece, so that the machine may be quickly set to cut at any required angle by attaching the corresponding gage-piece. The edge of the goods is placed against the gage-piece, the clamp-piece is brought down, the knife carried through in the slot, it being preferably arranged with rubber bands for returning to the starting-point.

The cutting of goods on bias is thus facilitated and accelerated, as any quantity of strips may be cut off in very short time.

Having thus described my invention, I claim as new, and desire to secure by Letters Patent—

1. An apparatus for cutting goods on bias, composed of a supporting-table, with one or more slots arranged on different bias angles, an adjustable treadle-operated clamp-piece, and adjustable gage-pieces corresponding to the angle of the slots, the whole being constructed and operated substantially as and for the purpose set forth.

2. The combination, with the adjustable base gage-piece, of one or more detachable gage-pieces, corresponding to the angles of the different slots in the table, for setting the goods to any required bias, as specified.

SALOMON MAYER.

Witnesses:
PAUL GOEPEL,
T. B. MOSHER.